United States Patent

[11] 3,630,376

| [72] | Inventor | Larry D. Price<br>2656 S. Union, Blue Island, Ill. 60406 |
|---|---|---|
| [21] | Appl. No. | 873,153 |
| [22] | Filed | Nov. 3, 1969 |
| [45] | Patented | Dec. 28, 1971 |

[54] OIL SLICK REMOVING VESSEL
6 Claims, 4 Drawing Figs.

[52] U.S. Cl.................................................... 210/242,
210/540
[51] Int. Cl.................................................. E02b 15/04,
B01d 21/24
[50] Field of Search.......................................... 210/73, 83,
84, 242, 523–525, 527, 537, 540

[56] References Cited
UNITED STATES PATENTS
2,330,508  9/1943  McColl........................  210/242

| 2,876,903 | 3/1959 | Lee................. | 210/242 |
| 3,219,190 | 11/1965 | Thune.............. | 210/242 |
| 3,268,081 | 8/1966 | Menkee et al...... | 210/242 |
| 3,348,690 | 10/1967 | Cornelissen........ | 210/242 |

*Primary Examiner*—John Adee
*Attorney*—Stone, Zummer & Aubel

ABSTRACT: A vessel is disclosed for removing floating oil and other waste matter from the surface of water, such as from lakes, harbors, rivers or seas. An elongated pipe having a plurality of spaced slits for permitting water to flow therethrough is positioned along the forward portion of the vessel. A pump provides water under pressure to the pipe. Means for adjusting the pitch of the vessel and the depth at which the pipe is positioned are also provided.

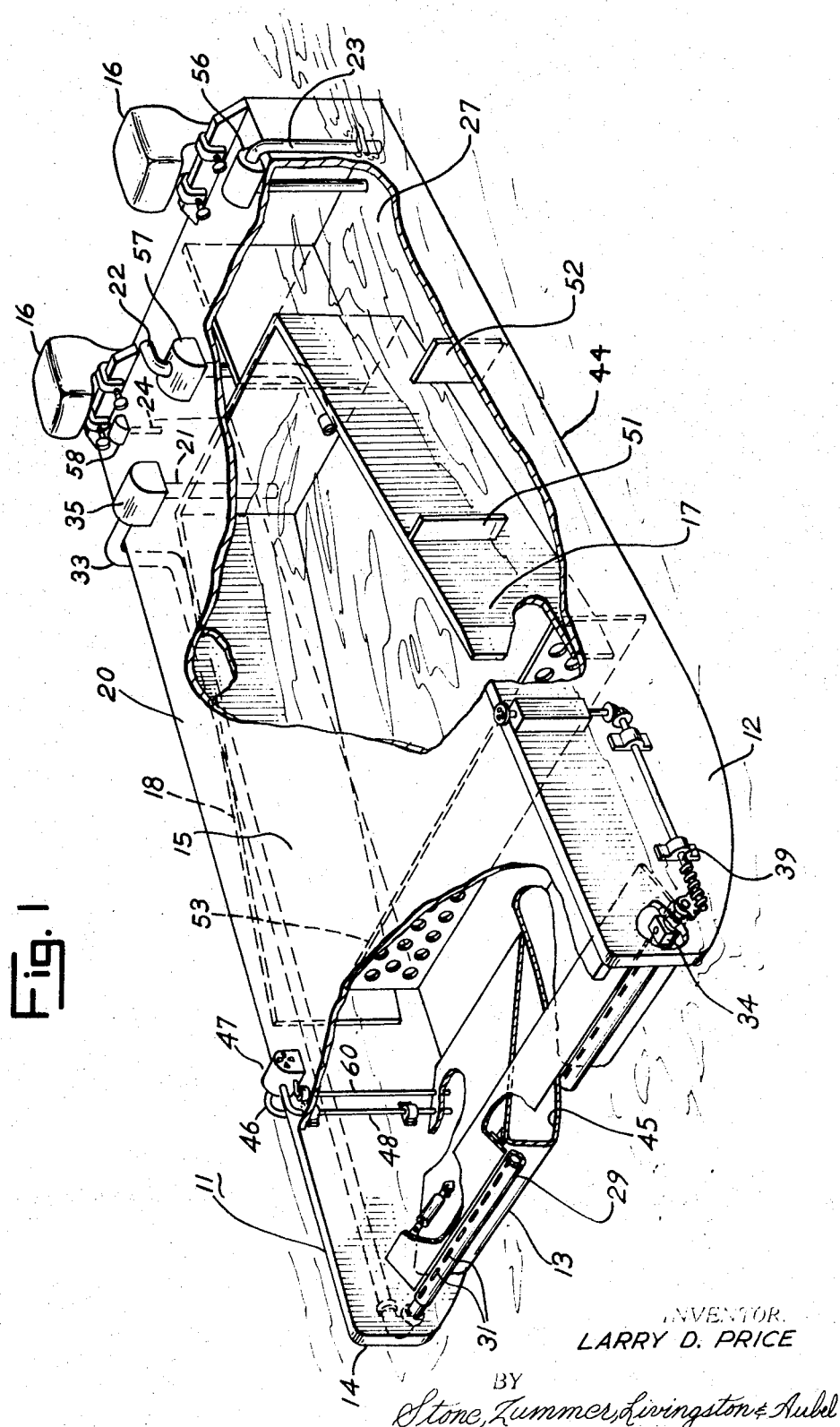

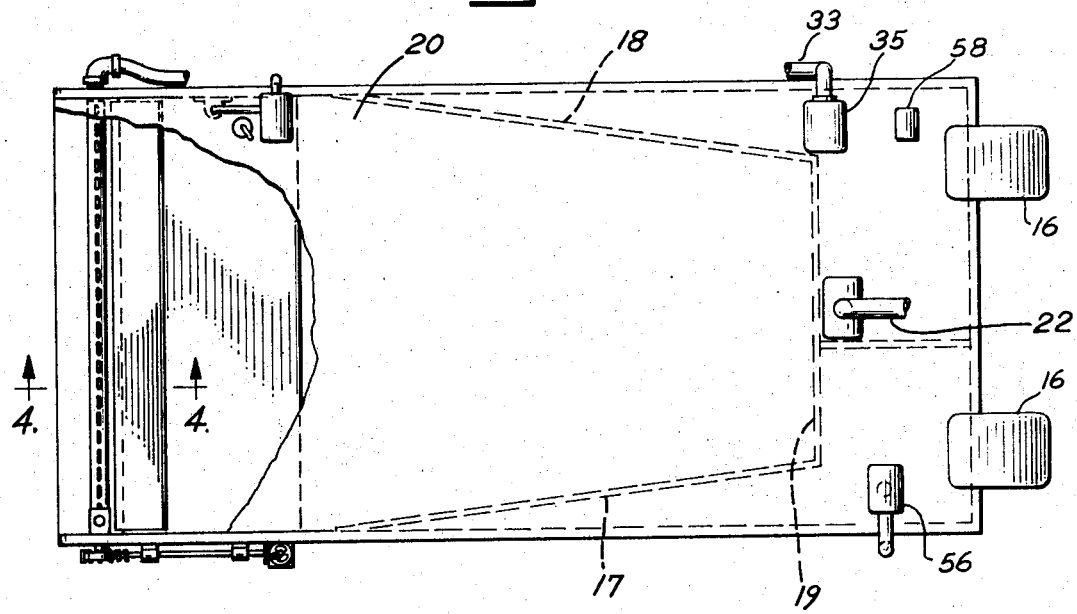
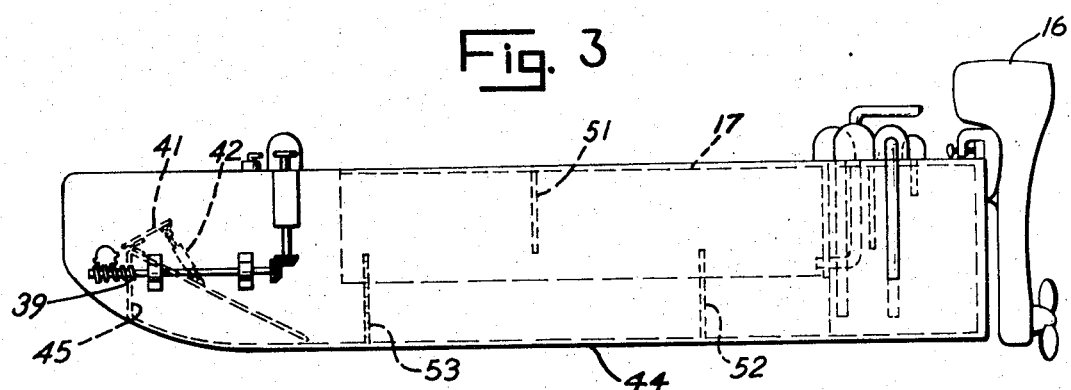
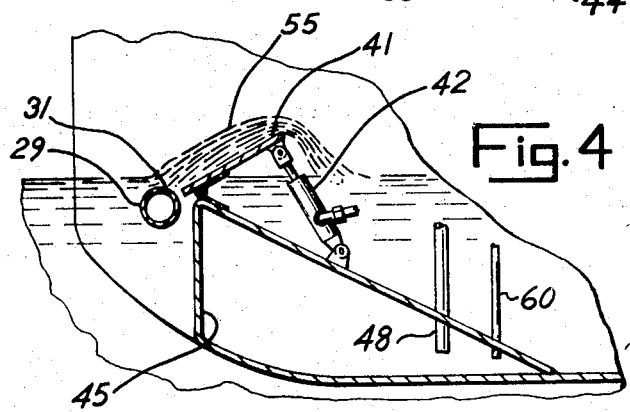

3,630,376

OIL SLICK REMOVING VESSEL

Due to the ever increasing consumption of oil products and the transport of oil via water, a great deal of oil is accidentally deposited in the waterways due to leakage, accidental discharge, or dumping of waste oil products from vessels.

Recently, a so-called mammoth tanker ran aground and was broken up causing oil to be distributed over wide expanses of water and beaches. Another problem occurred recently when a pipe in an offshore oil drilling rig sprang a leak causing great amounts of oil to be discharged into the adjoining water.

Various prior art apparatus and methods have been proposed for removing or collecting these oils and oily products from the surface of the water. Special boats and other devices have been fabricated in an attempt to provide apparatus to remove such oil and also other floating products, debris and garbage from the surface of the water. However, for one or more reasons, the prior art devices have not proven to be entirely satisfactory. Further, it is frequently necessary to remove garbage, floating debris and other waste matter from lakes, harbors, rivers or seas.

Accordingly, it is a principal object of this invention to provide a vessel which is especially equipped with means for removing oil debris and other waste matter from the surface of water.

It is another object of the invention to provide a vessel which is efficient in operation, relatively inexpensive to manufacture and maneuverable for operating in restricted places to clean the surface of the water of oil or debris.

The foregoing and other objects, features and advantages of the invention will be apparent from the following more particular description of a preferred embodiment of the invention, as illustrated in the accompanying drawings within:

FIG. 1 is an isometric view partially in cross section of the inventive vessel according to the invention;

FIG. 2 is a plan view of the vessel of FIG. 1;

FIG. 3 is a side view of the vessel of FIG. 1, particularly showing the pipe carrying the water under pressure for creating a wave or ripple; and, FIG. 4 is a view partially in cross section showing the wave flowing over the baffle plate.

Referring to the drawings, and initially to FIG. 1, the vessel 11 according to the invention is in the form of a barge having a relatively broad square bow portion 13, and a relatively flat bottom or hull 44. Suitable motors 16 may be affixed to the stern of the vessel 11 for propulsion. In the embodiment shown, the barge 11 is self-propelled, but it may also be pushed by another boat.

A holding chamber 15 is positioned in the center portion of the vessel 11, see FIG. 2. Chamber 15 has downwardly extending sides 17 and 18 and a downwardly extending back 19 all of which terminate at a point above hull 44, see FIG. 3. More specifically, sides 17, 18 and back 19 extend downwardly approximately two-thirds the depth of the vessel 11, and can be extended downwardly even farther by provision of suitable flat plates which can be fastened to the sides 17, 18 and back 19, as is well known. A cover 20 which functions as the cover or deck for the vessel 11 also provides a cover for chamber 15.

The sides 17 and 18 of chamber 15 taper outwardly from the back 19 and abut against the sides 12 and 14 at a forward portion of vessel 11. Note that sides 12 and 14 of the vessel 11 extend forwardly of, or ahead of the bow 13, and thus tend to force water into the vessel 11 rather than splashing it aside as done by the usual type boat. Various vertically oriented pipes 21, 22, 23 and 24 extend into the hold 27 or inner part of the barge 11 for purposes to be described.

A pipe 29 for carrying water is mounted in a horizontal position along the bow 13. Pipe 29 includes a series of slits or holes 31 for permitting water to flow outwardly therefrom, as will be explained.

One end, the left-hand end, as oriented in FIG. 1, of pipe 29 is affixed through pipe 33 to a pressure pump 35. Pump 35 pumps water from hold 27 by pipe 21 and through 33 to pipe 29. The free end of pipe 29 includes a valve 34 to permit more or less water to flow therethrough to control the amount and pressure of the water passing outwardly through slits 31. The position of the slits 31, and hence the direction in which the water under pressure in pipe 29 is caused to flow, is adjustable by means of a suitable gearing assembly generally labeled 39, see FIGS. 1 and 4.

A baffle plate 41 is hingedly mounted in a horizontal position along bow 13 and is pivotably movable about a horizontal axis as by a power assembly generally labeled 42.

In operation, water is drawn into hold 27 of vessel 11 by means of one or more suitable pumps 56, or means of a sea cock, to raise the water level in the hold 27 above the lower edge of the sides 17, 18 and back 19 of holding chamber 15. The vessel 11 is thus effectively lowered into the water by the foregoing flooding such that the pipe 29 is positioned below the surface of the water. The pitch of the vessel 11, or the depth of the bow 13, in the water is also controlled by pumping water in or out of a closed hold 45 positioned along the bow 13. When water is pumped into hold 45 through pipes 46 and 48, suitable reversible pump 47, displaced air will be allowed to escape through pipe 60 and the associated valve (not numbered), the bow sinks deeper in the water, while if water is pumped out of hold 45 by pump 47, the bow 13 tends to rise, hence controlling the position of the pipe 29.

Next, water from hold 27 and pipe 21 will be pumped by pump 35 under pressure through pipe 33 and to pipe 29. The water under pressure will thus be forced out of the slits 31 to create a wave 55 which is forced over the top of baffle plate 41. The water pressure and the size of the wave depends on the pressure created by pump 35, the size of the slits 31, the setting of the valve 34 and the depth that pipe 29 is under the surface of the body of water. The water flowing out of the holes or slits 31 is thus caused to form a ripple or wave sufficiently high such that a sheet of water carrying oil or debris goes over top of baffle plate 41, see FIG. 4.

The vessel 11 is then propelled forward; and, pumps 35 and 56 continue to pump water. Baffle plate 41 is adjusted to control the thickness of the sheet of water that goes over the top of the baffle plate into the holding chamber 15. As the sheet of water and oil moves over the baffle plate, the globules of oil are not broken up, but rather the mass of oil on the water caused to move smoothly over the top of the baffle plate 41 onto the holding chamber 15.

Since the water level in the holding chamber 15 is above the lower edge of the sides 17, 18 and back 19 of the holding chamber 15, the water which is heavier than oil acts as a bottom or base surface for the oil and maintains the oil within the holding chamber 15. As more and more water and oil float into the holding chamber 15, the water in the barge is pumped out by pump 59 through pipe 22 to a suitable storage means on the deck 20 of vessel 11 or to an associated barge. Any excess water in the vessel 11 can be pumped out through pipe 23 by pump 56 and the water level in hold 27 maintained at a suitable level.

The water pressure in the pipe 29, the relative orientation of the holes or slits 31, the angle of the baffle plate 41, and the pitch of the vessel 11 may be continuously adjusted to provide good control of the sheet of water and oil moving over the baffle plate 41 into the holding chamber 15.

While the vessel may operate successfully without the holding chamber 15, the chamber is useful in collecting the oil and debris into a thickness which can be conveniently removed.

Vertically positioned plates, such as 51, 52 and 53 and 54 can be placed in hold 27 and in holding chamber 15 to prevent excessive sloshing of the water in the vessel 11 and to thus increase its stability. Pump 58 is used to pump air in and out of hold 27 as necessary, and in certain embodiments may comprise a vent means.

While the explanation above has been directed to removing oil from water, the same operation is employed to remove other floating debris from water.

I claim:

1. A vessel movable along the surface of a body of water for collecting and removing liquid and solid waste matter floating on the surface of said body of water comprising, in combination, first means independent of the movement of said vessel for selectively providing water under pressure substantially along a horizontal line beneath the surface of the water to form an upwardly directed wave in the body of water, means for permitting a selected portion of the wave thus formed to pass thereover and into said vessel, and means for withdrawing the liquid and solid waste matter from said vessel into suitable receptacles.

2. A vessel as in claim 1 wherein said means for permitting a portion of the wave to pass thereover comprises a substantially horizontally positioned plate which is pivotable about a substantially horizontal line.

3. A vessel as in claim 1 wherein said means for providing water under pressure comprises an elongated pipe positioned along the forward portion of said vessel, pump means for providing water under pressure to said pipe, and said pipe having a plurality of spaced slits for permitting water to flow therethrough.

4. An apparatus as in claim 3, further including means for providing water to said elongated pipe from the water in said vessel.

5. A vessel as in claim 3 further including means for adjusting the pitch of said vessel and the depth at which said pipe is positioned beneath the surface of said body of water.

6. A vessel as in claim 1 further including a holding chamber for receiving said liquid and waste matter, said chamber having downwardly extending sides, means for filling said vessel with water to a level above the lower edge of said sides to provide a base of water on which said liquid and waste matter will float contained in said chamber, and means for removing the liquid and waste matter from said chamber.

* * * * *